US012095162B2

(12) United States Patent
Wang et al.

(10) Patent No.: US 12,095,162 B2
(45) Date of Patent: Sep. 17, 2024

(54) SMART SPEAKER

(71) Applicant: LUXSHARE PRECISION INDUSTRY COMPANY LIMITED, Shenzhen (CN)

(72) Inventors: Yan Wang, Shenzhen (CN); ZeKui Fu, Shenzhen (CN); JinXiang Liu, Shenzhen (CN); ShuMin Qiu, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 183 days.

(21) Appl. No.: 17/975,200

(22) Filed: Oct. 27, 2022

(65) Prior Publication Data

US 2024/0006755 A1 Jan. 4, 2024

(30) Foreign Application Priority Data

Jul. 1, 2022 (CN) ........................ 202210766017.2

(51) Int. Cl.

*H01Q 1/44* (2006.01)
*H01Q 1/22* (2006.01)
*H01Q 19/02* (2006.01)
*H01Q 21/20* (2006.01)
*H04R 3/00* (2006.01)
*H04R 1/40* (2006.01)

(52) U.S. Cl.

CPC ......... *H01Q 19/021* (2013.01); *H01Q 1/2291* (2013.01); *H01Q 1/44* (2013.01); *H01Q 21/205* (2013.01); *H04R 1/403* (2013.01); *H04R 3/00* (2013.01)

(58) Field of Classification Search

None

See application file for complete search history.

(56) References Cited

U.S. PATENT DOCUMENTS

| | | | | |
|---|---|---|---|---|
| 10,979,810 | B2 * | 4/2021 | Mata Magana | H04R 1/02 |
| 2016/0309246 | A1 * | 10/2016 | O'Keeffe | H04W 4/70 |
| 2019/0394547 | A1 * | 12/2019 | Lemons | H04R 1/028 |
| 2020/0374611 | A1 * | 11/2020 | Kim | H04R 1/021 |

FOREIGN PATENT DOCUMENTS

| | | | | | |
|---|---|---|---|---|---|
| CN | 112105242 | A | * | 12/2020 | F28D 15/02 |
| CN | 212782279 | U | | 3/2021 | |
| TW | 200623532 | A | | 7/2006 | |
| TW | 201705614 | A | | 2/2017 | |
| WO | WO-2020209677 | A1 | * | 10/2020 | |

* cited by examiner

*Primary Examiner* — Dameon E Levi
*Assistant Examiner* — Anh N Ho
(74) *Attorney, Agent, or Firm* — Birch, Stewart, Kolasch & Birch, LLP

(57) ABSTRACT

The present disclosure provides a smart speaker, which comprises a first inner casing, a second inner casing, a first housing, a second housing, and a first director group. The first inner casing comprises at least one first speaking unit. The second inner casing is disposed on the first inner casing and comprises at least one second speaking unit and at least one active antenna module. The first housing surrounds and covers the first inner casing, and the second housing surrounds and covers the second inner casing. The first director group is disposed at one side of the second housing facing the second inner casing, and the position of the first director group corresponds to at least one active antenna module.

10 Claims, 7 Drawing Sheets

SMART SPEAKER

CROSS-REFERENCE TO RELATED APPLICATION

This application claims the priority benefit of Chinese Patent Application Serial Number 202210766017.2, filed on Jul. 1, 2022, the full disclosure of which is incorporated herein by reference.

BACKGROUND

Technical Field

The present disclosure relates to the technical field of speaker, particularly to radio frequency and antenna technology for smart speaker.

Related Art

With the popularization of smart speakers, a better user experience for smart speaker products is more constantly in demand, where the disconnection and playback freezes during use are concerned, particularly in public squares, subways, airports, and other crowded places, that the above-mentioned issues of disconnection and playback freezes would happen more frequently.

Specifically, user experience of conventional smart speakers is very unsatisfactory, mainly because the space inside the smart speaker for parts installation is limited. Besides the speaking units and related electronic parts, the installation of multiple antennas in the speaker also needs to be considered. Since the transmitting and receiving ability of antenna would be affected by the environment nearby, when an antenna is installed in a limited space and there are other antennas or metal objects around, the said abilities would have a significant drop in a specific direction.

Practically, in order to visualize the radiation characteristics and transmit-receive capabilities of the antenna, the relationship between the radiation characteristics of the antenna and the coordinates of the spatial direction is depicted as an antenna pattern. That is, when the transmit-receive capabilities of the antennas disposed on the smart speaker present a significant drop in a specific direction, the depicted antenna pattern would also have a correspondingly poor presentation.

Commercial sales licenses (such as China Radio Management Certification SRRC, Federal Communications Commission of the United States attestation FCC, Korea Certification KC, etc.) of speaker products are necessary for business purposes. In the testing items about the antenna directivity coefficient for these licenses, the directivity coefficient D in the 2.4 G frequency band is required to be no greater than 4.5 dB (D<4.5 dB). When the tested value of the directivity coefficient D is greater than 4.5 dB, the product would not pass the test and thus no certification would be granted. So, the product would not be permitted for selling in the market.

In general, when there is a significant difference between the signal blind zone and the signal peak zone in the antenna pattern, the anti-interference ability is generally poor, where the directivity coefficient D in the 2.4 G frequency band is high (D>4.5 dB), so there would be obvious disconnection and playback freezes. On the contrary, the antenna pattern without an obvious signal blind zone and the signal peak zone can be regarded as having uniform signal strength, showing a low directivity coefficient D (D<4.5 dB) with excellent anti-interference ability.

Thus, the present disclosure provides a smart speaker with an active antenna capable of uniform signal transmission and reception, thereby having a low directivity coefficient D and excellent anti-interference ability.

SUMMARY

The present disclosure provides a smart speaker, comprising:

- a first inner casing comprising at least one first speaking unit;
- a second inner casing disposed on the first inner casing, the second inner casing comprising at least one second speaking unit and at least one active antenna module;
- a first housing surrounding and covering the first inner casing;
- a second housing surrounding and covering the second inner casing; and
- a first director group disposed at one side of the second housing facing the second inner casing, a position of the first director group corresponding to the at least one active antenna module.

In the smart speaker of the present disclosure, the at least one active antenna module comprises a first active antenna located in a central area of the second inner casing.

In the smart speaker of the present disclosure, the first director group is located in an electromagnetic field generated by the first active antenna.

In the smart speaker of the present disclosure, the first director group comprises a first director and a second director. The first director and the second director are oppositely disposed.

In the smart speaker of the present disclosure, the at least one active antenna module further comprises a second active antenna, a third active antenna, and a fourth active antenna disposed around the first active antenna.

In the smart speaker of the present disclosure, the second active antenna, the third active antenna, and the fourth active antenna are located between the first active antenna and the at least one second speaking unit.

The smart speaker of the present disclosure further comprises a second director group comprising a third director and a fourth director. The third director and the fourth director are oppositely disposed.

In the smart speaker of the present disclosure, the first director group and the second director group are metal director groups generating an induced electric current in an electromagnetic field generated by the at least one active antenna module.

In the smart speaker of the present disclosure, the first director and the second director are arc-shaped directors. The second housing comprises a center of circle. A first distance exists between a side edge of the arc-shaped director away from the center of circle and the center of circle. The side edge of the arc-shaped director away from the center of circle has a first length.

In the smart speaker of the present disclosure, the third director and the fourth director are located on a side edge of the second housing and are away from the at least one second speaking unit.

In the embodiments of the present disclosure, through the director group, electromagnetic fields generated by active antennas installed on the smart speaker can be adjusted to have uniform signal strength, thereby having a low directivity coefficient D and excellent anti-interference ability.

Thus, the problems of disconnection and playback freeze due to the easy-interfering characteristics of conventional smart speakers can be solved.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
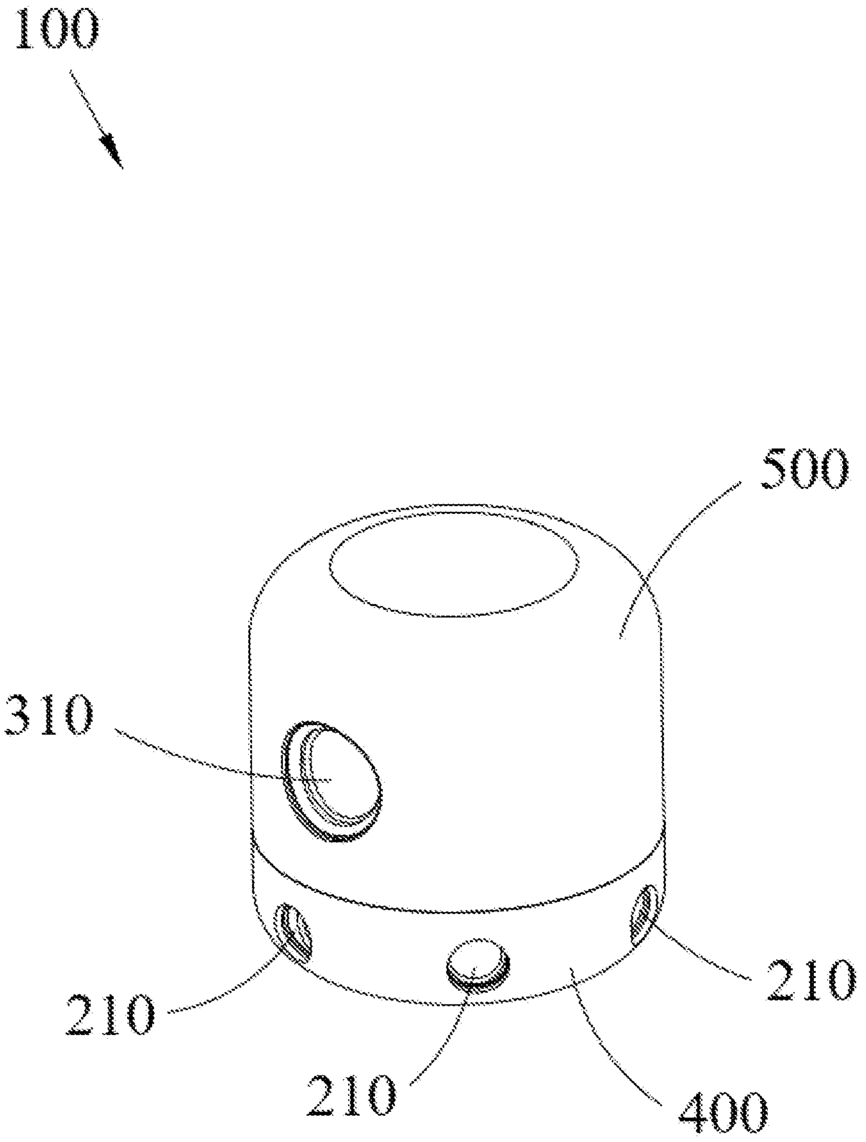
FIG. 1 is a perspective view of a smart speaker of the present disclosure.
Figure 2:
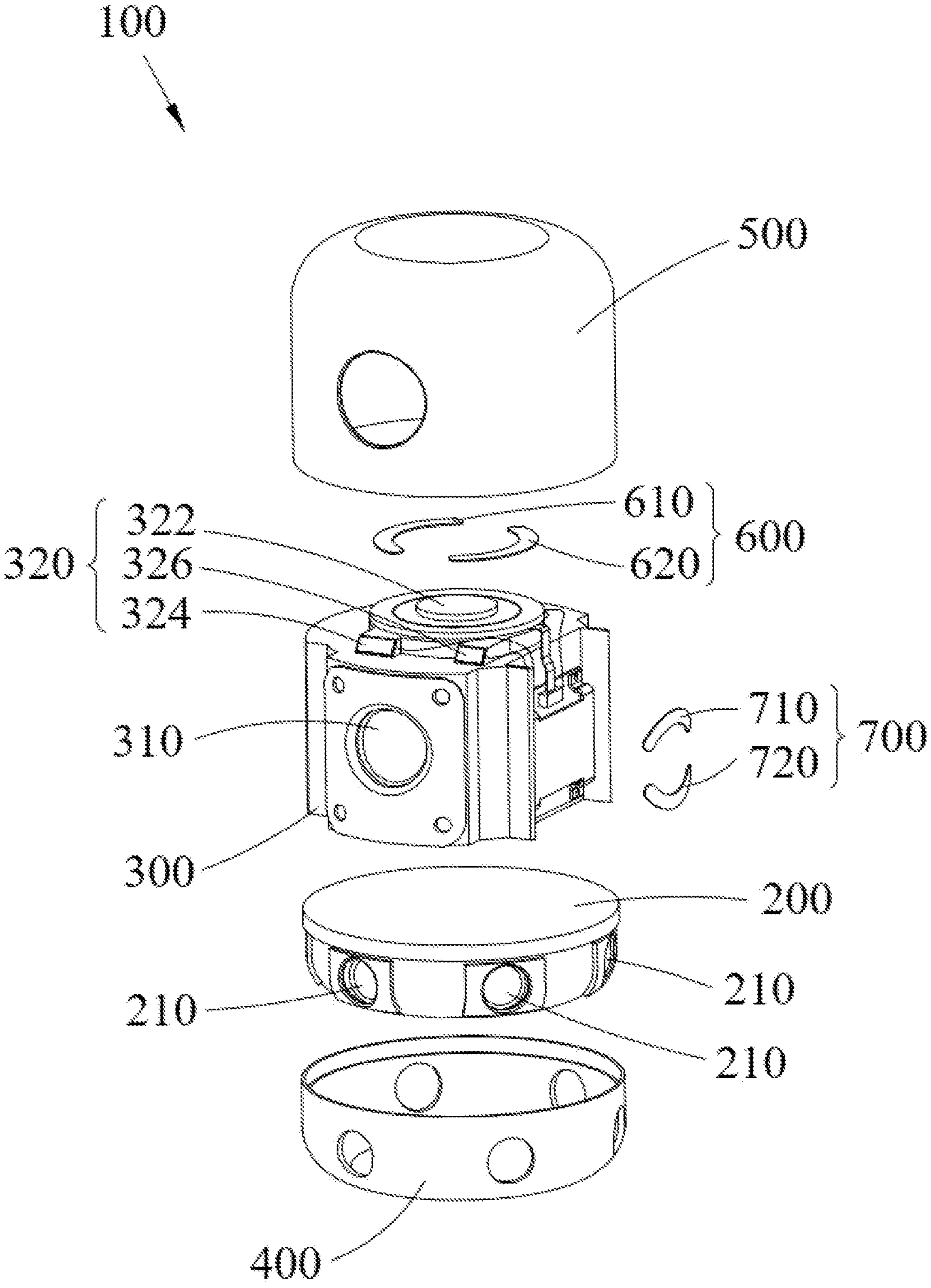
FIG. 2 is an exploded view of the smart speaker of the present disclosure.

As shown in FIG. 1 and FIG. 2, the present disclosure provides a smart speaker 100, comprising a first inner casing 200, a second inner casing 300, a first housing 400, a second housing 500, and a first director group 600.

Figure 3:
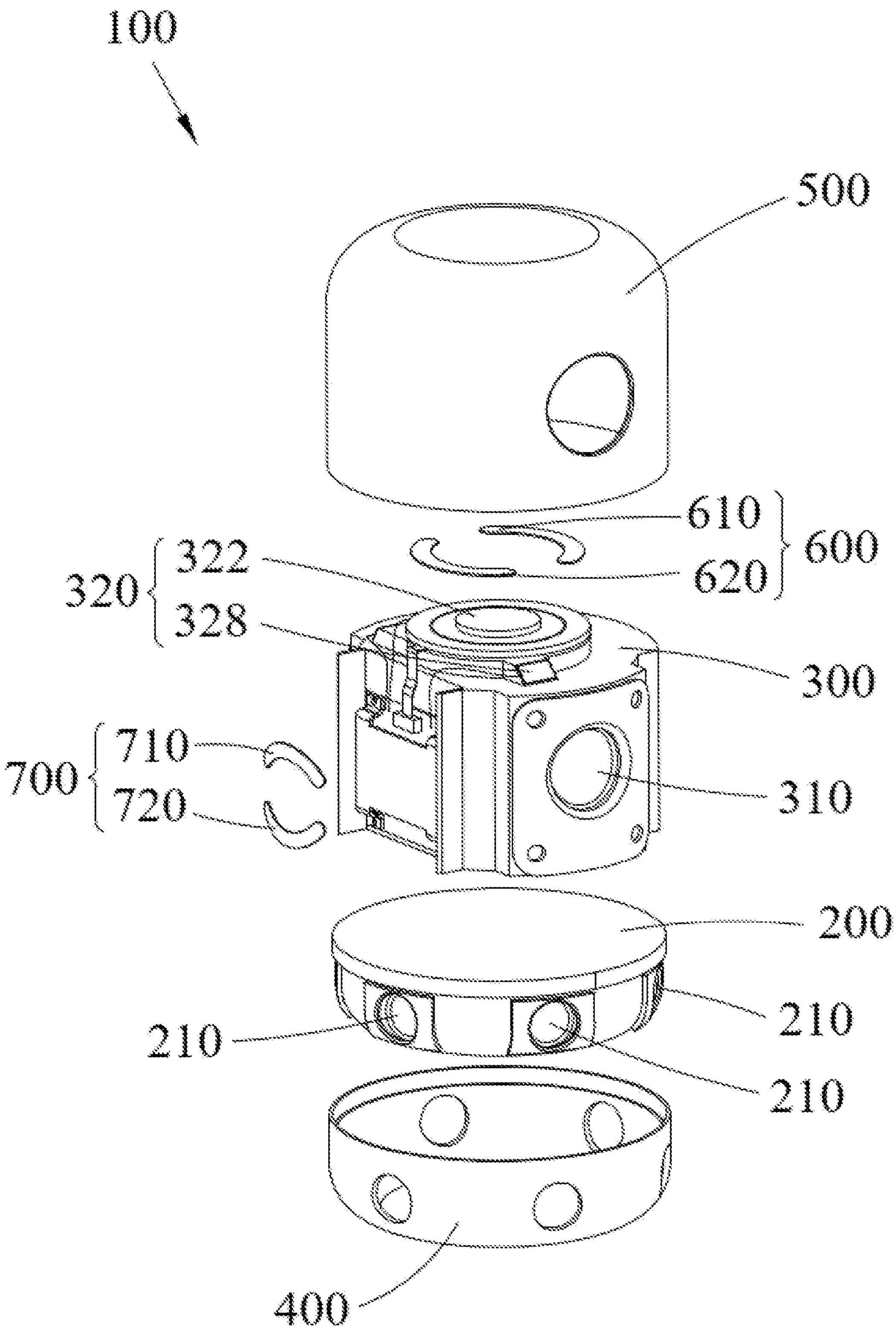
FIG. 3 is an exploded view of the smart speaker of the present disclosure from another perspective.

Referring to FIG. 1, FIG. 2, and FIG. 3, the first inner casing 200 comprises at least one first speaking unit 210 disposed in the first inner casing 200. The second inner casing 300 is disposed above the first inner casing 200 and comprises at least one second speaking unit 310 and at least one active antenna module 320. That is, when the second inner casing 300 is disposed above the first inner casing 200, an inner space of the first inner casing 200 and an inner space of the second inner casing 300 are suitable for accommodating a body of at least one first speaking unit 210, a body of at least one second speaking unit 310, as well as other electronic components and circuit boards (not shown) required to form a smart speaker. Preferably, the first inner casing 200 and the second inner casing 300 can be made of metal, providing electromagnetic shielding for the body of the first speaking unit 210 and the body of the second speaking unit 310 inside the inner casings and other electronic components and circuit boards required to form a smart speaker.

The first housing 400 is disposed around the first inner casing 200 and covers the first inner casing 200, and the second housing 500 is disposed on the first housing 400 and surrounds the second inner casing 300. So, the first housing 400 and the second housing 500 could form a housing, and an inner space of the housing is suitable for accommodating a combination of the first inner casing 200 and the second inner casing 300. The first director group 600 is disposed at one side of the second housing 500 facing the second inner casing 300, and the position of the first director group 600 corresponds to at least one active antenna module 320.

In detail, as shown in FIG. 2 and FIG. 3, in the smart speaker 100 of the present disclosure, the at least one active antenna module 320 may comprise a first active antenna 322. The first active antenna 322 is located in a central area of the second inner casing 300. The first director group 600 is located in the electromagnetic field generated by the first active antenna 322. The first director group 600 comprises a first director 610 and a second director 620, which are oppositely disposed. And preferably, the positions of the first director 610 and the second director 620 correspond to the first active antenna 322.

Figure 4:
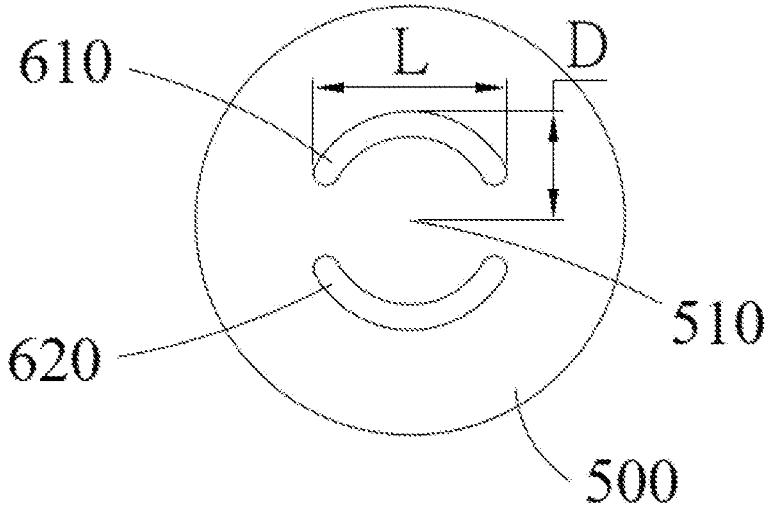
FIG. 4 is an arrangement schematic diagram of a first director group of the smart speaker of the present disclosure.

As shown in FIG. 4, in one embodiment, the first director 610 and the second director 620 are arc-shaped directors, and the second housing 500 comprises a center of circle 510. A first distance D exists between a side edge of the arc-shaped director away from the center of circle 510 and the center of circle 510, where the first distance D is preferably 46.8 mm. The side edge of the arc-shaped director away from the center 510 has a first length L, where the first length L is preferably 107.8 mm, but it is not limited thereto. In other embodiments, the values of the first distance D and the first length L of the aforementioned arc director can also be adjusted according to the energy intensity to be corrected after measuring the antenna pattern of the electromagnetic field generated by the first active antenna 322.

In the smart speaker 100 of the present disclosure, as shown in FIG. 2 and FIG. 3, the at least one active antenna module 320 may comprise a second active antenna 324, a third active antenna 326, and a fourth active antenna 328, which are disposed around the first active antenna 322, and preferably located between the first active antenna 322 and the at least one second speaking unit 310, where the second active antenna 324 is adjacent to the third active antenna 326, and the fourth active antenna 328 is located at an opposite side of the second active antenna 324 and the third active antenna 326. In this way, through the same adjustment method to the first active antenna 322 mentioned above, after measuring the antenna pattern of the electromagnetic field jointly generated by the first active antenna 322, the second active antenna 324, the third active antenna 326, and the fourth active antenna 328, engineers could set the first director group 600 according to the energy intensity to be corrected.

The at least one active antenna module 320 of the smart speaker 100 of the present disclosure could be a near field communication (NFC) antenna, a Bluetooth (BT) antenna, a Wi-Fi antenna, etc. So, in the embodiments shown in the drawings, the first active antenna 322 can be a near-field communication antenna, the second active antenna 324 can be a Bluetooth antenna, and both the third active antenna 326 and the fourth active antenna 328 can be Wi-Fi antennas, but should not be limited thereto.

As shown in FIG. 2, the smart speaker 100 of the present disclosure may further comprise a second director group 700. The second director group 700 comprises a third director 710 and a fourth director 720, which are oppositely disposed. A side edge of the third director 710 and a side edge of the fourth director 720 on the second housing faces one side of the second inner casing 300 and is away from the at least one second speaking unit 310.

It should be noted that in the present embodiment, the second director group 700 is provided for adjusting the antenna pattern of the smart speaker 100. Although the second director group 700 is not located above any active antenna, the second director group 700 would still be located in the electromagnetic field generated by the first active antenna 322, the second active antenna 324, the third active antenna 326, and the fourth active antenna 328, and would correct the aforementioned magnetic field to adjust the antenna pattern for the smart speaker 100.

Figure 5:
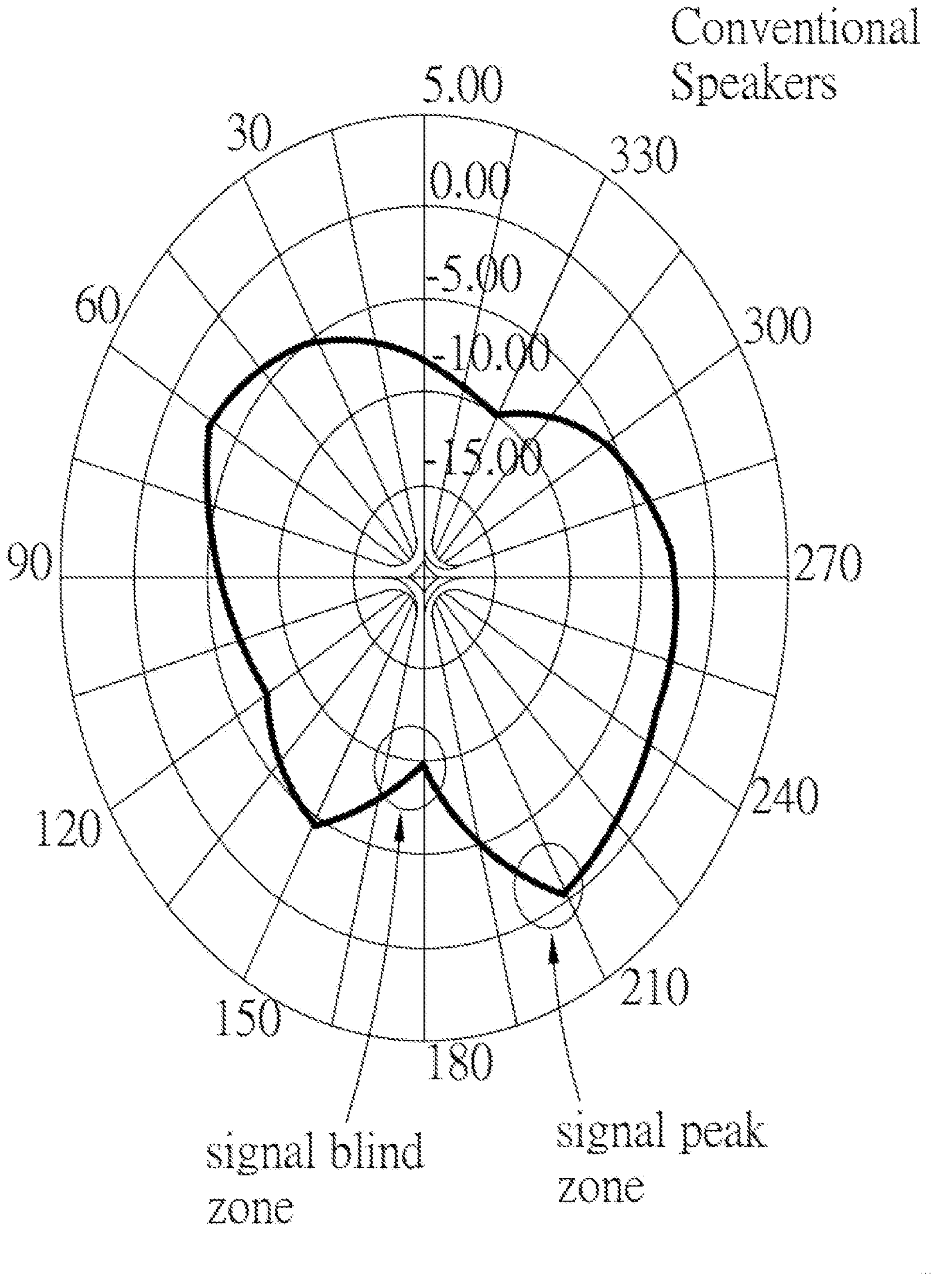
FIG. 5 is an antenna pattern when the smart speaker of the present disclosure is not equipped with the first director group nor a second director group.

As shown in FIG. 5, when the first director group 600 and the second director group 700 are not provided, an antenna pattern of the untuned smart speaker 100 can be obtained through measurements, which shows that the untuned smart speaker 100 has a strong signal zone in the 210° direction, and the energy in this zone is particularly concentrated, so it can be regarded as a signal peak zone. The signal in the 180° direction is weak so referred to as a signal blind zone. Thus, when the first director group 600 and the second director group 700 are not provided, the untuned smart speaker 100 has poor anti-interference ability.

Figure 6:
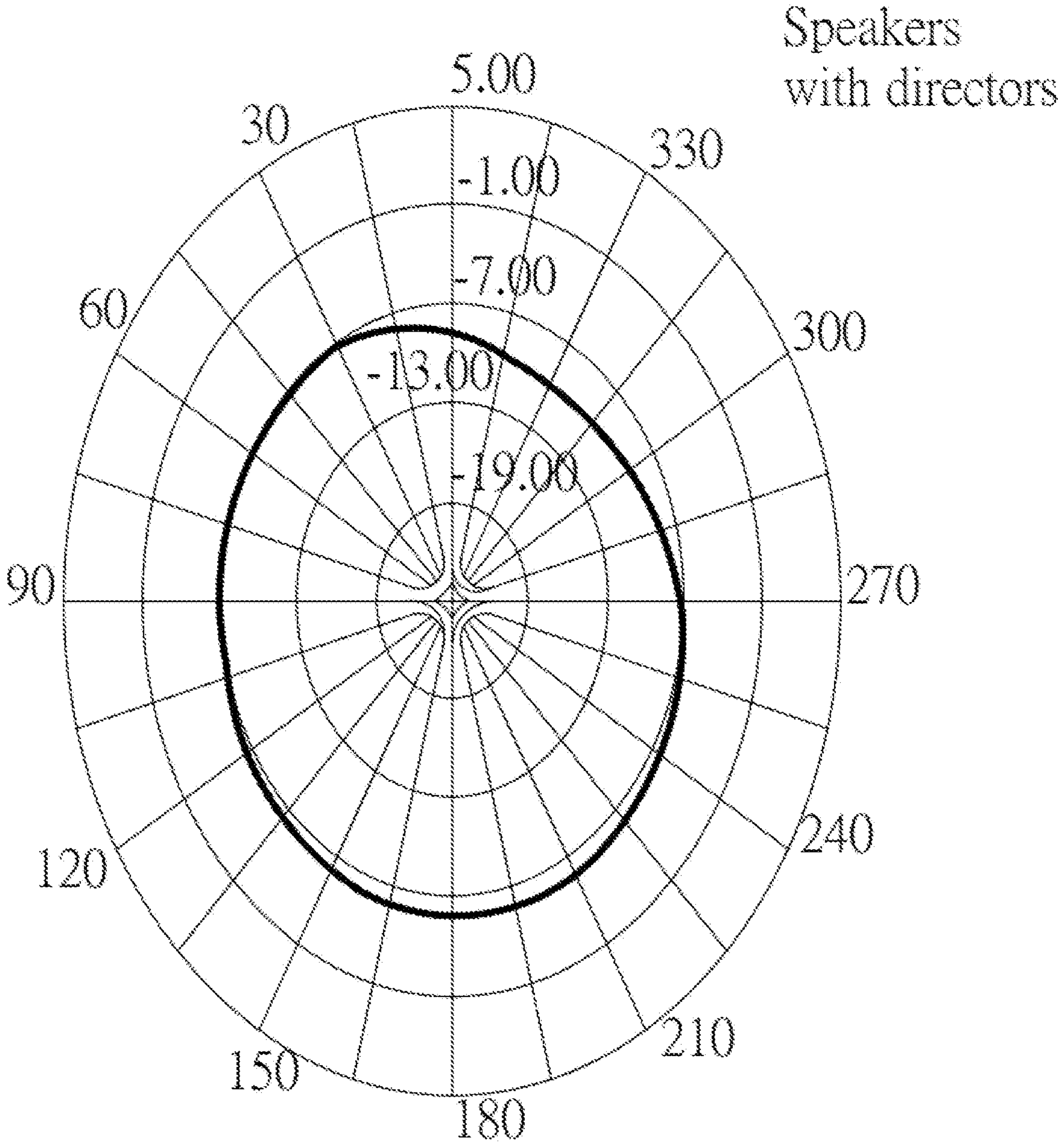
FIG. 6 is an antenna pattern when the smart speaker of the present disclosure is equipped with the first director group and the second director group.

As shown in FIG. 6, through the first director group 600 and the second director group 700, a part of the energy in other zones can be guided to the signal blind zone, thereby enabling the antenna pattern of the smart speaker 100 of the present disclosure to have uniform signal strength for a better anti-interference ability.

The following takes the second active antenna 324 as the Bluetooth antenna to describe the guiding function of the director.

Figure 7:
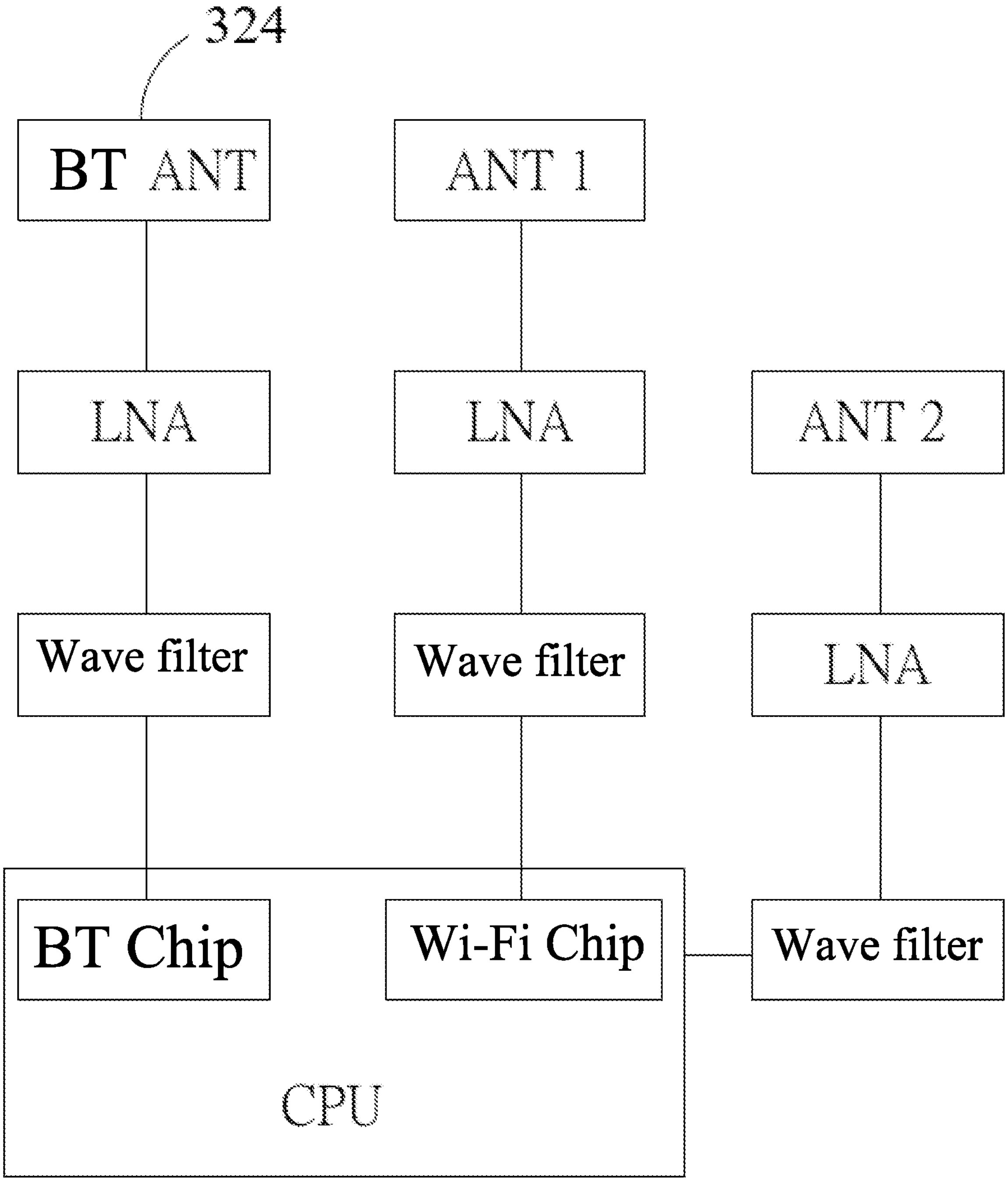
FIG. 7 is a schematic diagram showing an active antenna of the smart speaker of the present disclosure that carries out electrical signal transmission.

As shown in FIG. 7, an electrical signal is transmitted by the Bluetooth (BT) chip and then transmitted to the low noise amplifier (LNA) after being filtered by wave filter, and the electrical signal is converted into electromagnetic waves by the second active antenna 324 and radiated. Thus, under the forward guidance of the first director 610, a part of the energy of the electromagnetic wave would be guided to a direction having weak signals. It can be seen that the director can guide a part of energy from a direction having larger radiation energy to a direction having weak radiation energy for obtaining a directivity coefficient D with a lower value.

The first director group 600 and the second director group 700 of the smart speaker 100 of the present disclosure are metal director groups, and the metal director groups can generate an induced electric current in an electromagnetic field generated by at least one active antenna module 320 for correcting the electromagnetic field.

By actual testing, the directivity coefficient D of the smart speaker 100 of the present disclosure before the first director group 600 and the second director group 700 are equipped is 5.6 dB, which is greater than 4.5 dB and could not pass certification. When the first director group 600 and the second director group 700 are installed, the adjusted directivity coefficient D would be reduced to 3.3 dB, which is lower than 4.5 dB and satisfy the requirement for certification, and the anti-interference ability of the smart speaker 100 has also been greatly improved.

In a preferable embodiment of the smart speaker 100 of the present disclosure, at least one first speaking unit 210 is a woofer, where the number of at least one first speaking unit 210 is six. The at least one second speaking unit 220 is a tweeter, where the number of the at least one second speaking unit 220 is two, but should not be limited thereto. In other words, according to various design requirements, the first speaking unit 210 can also be tweeters, the second speaking unit 220 can also be woofers, and meanwhile, the number of the speaking units can be adjusted accordingly.

In summary, in the smart speaker of the present disclosure, through the director group, the signal strength of the electromagnetic field of the active antenna installed on the smart speaker can be adjusted. A part of the radiated energy in the signal peak zone or other zones of the antenna pattern can be directed to the signal blind zone, and the adjusted antenna pattern would have uniform signal strength, thereby improving the anti-interference ability of the product and reducing the probability of playback freezes during use, and effectively solving the problems of disconnection and playback freeze of conventional smart speakers that are less interference-resistant. On the other hand, since the adjusted antenna pattern has a lower directivity coefficient D, certifications for related product verifications can be granted with a higher possibility.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A smart speaker, comprising:

a first inner casing comprising at least one first speaking unit;

a second inner casing disposed on the first inner casing, the second inner casing comprising at least one second speaking unit and at least one active antenna module;

a first housing surrounding and covering the first inner casing;

a second housing surrounding and covering the second inner casing; and a first director group disposed at one side of the second housing facing the second inner casing, a position of the first director group corresponding to the at least one active antenna module.

2. The smart speaker according to claim 1, wherein the at least one active antenna module comprises a first active antenna located in a central area of the second inner casing.

3. The smart speaker according to claim 2, wherein the first director group is located in an electromagnetic field generated by the first active antenna.

4. The smart speaker according to claim 3, wherein the first director group comprises a first director and a second director; the first director and the second director are oppositely disposed.

5. The smart speaker according to claim 2, wherein the at least one active antenna module further comprises a second active antenna, a third active antenna, and a fourth active antenna disposed around the first active antenna.

6. The smart speaker according to claim 5, wherein the second active antenna, the third active antenna, and the fourth active antenna are located between the first active antenna and the at least one second speaking unit.

7. The smart speaker according to claim 1 comprising a second director group comprising a third director and a fourth director, the third director and the fourth director being oppositely disposed.

8. The smart speaker according to claim 7, wherein the first director group and the second director group are metal director groups generating an induced electric current in an electromagnetic field generated by the at least one active antenna module.

9. The smart speaker according to claim 8, wherein the first director and the second director are arc-shaped directors; the second housing comprises a center of circle; a first distance exists between a side edge of the arc-shaped director away from the center of circle and the center of circle; the side edge of the arc-shaped director away from the center of circle has a first length.

10. The smart speaker according to claim 7, wherein the third director and the fourth director are located on a side edge of the second housing and are away from the at least one second speaking unit.

* * * * *